Dec. 18, 1962 L. B. HAIGH ET AL 3,069,503

TELEPHONE CALL COMPLETION INDICATOR

Filed Dec. 30, 1957

INVENTOR
LESLIE B. HAIGH
HENRY F. HERBIG
ABELINO C. BUCAREY

BY [signature]
ATTORNEY

United States Patent Office 3,069,503

Patented Dec. 18, 1962

3,069,503

TELEPHONE CALL COMPLETION INDICATOR

Leslie B. Haigh, West Orange, Henry F. Herbig, Smoke Rise, and Abelino C. Bucarey, Oxford, N.J., assignors to International Telephone and Telegraph Corporation, Nutley, N.J., a corporation of Maryland Filed Dec. 30, 1957, Ser. No. 705,952
12 Claims. (Cl. 179—9)

This invention relates to automatic ticketing telephone systems and in particular to a private automatic branch exchange operating in conjunction with a major telephone system.

Many organizations, such as service groups of the Army, the Navy and Air Force and large industrial groups have needs within the confinements of their private operation for a local automatic ticketing or message registering system. Usually these various groups are billed by the major telephone companies for the bulk call units that have been initiated at the particular place of operation. Within the private operation itself the groups are interested in who made the call so that they might either bill the party individually or allocate a particular call to the cost of a certain department, etc. These private exchanges are usually connected to a major telephone system, where accounting records are made, and there is little feasibility of using the techniques of the major telephone company for determining when a called party has answered, the times for the calls, etc., at the private exchange. Instead, the private exchange must rely on local equipment to determine the desired bits of information. The determination of who initiates the call is a comparatively small problem since the techniques used by the major telephone exchanges are available. However, when it is requisite for the local operation at a PABX to determine whether or not the call has been answered, a serious problem arises since the private exchange equipment does not receive answer signals from the central office, such as the reverse of polarity technique used by the major telephone companys and must depend on some other solution.

An object of this invention is to provide a device for a private automatic branch exchange which will determine whether or not a called party has answered the call.

Another object of the present invention is to provide a device for a private automatic branch exchange (PABX) which will determine whether or not a called party has answered by using signals already available on any major telephone system.

In accordance with a main feature of the present invention there is provided a ring-back tone detector means through which the ring-back tone is passed to condition some message register equipment at the private exchange such that the termination of this ring-back tone will indicate the call has been answered.

In accordance with another embodiment of the present invention a main feature provides a voice receiving amplification means through which the voice signal of the called party causes answering signal detector equipment to respond and indicate that the called party has answered.

Another feature of the present invention, operating in conjunction with the last-mentioned feature, provides a voice signal step-down transformer coupled to the calling party's line in order to prevent the calling party's voice signal from falsely indicating that the call has been answered.

The foregoing and other objects and features of this invention and the manner of attaining them will become more apparennt and the invention itself will be best understood by reference to the following description of an embodiment of the invention taken in conjunction with the accompanying drawings comprising FIGS. 1 and 2, wherein.

Figure 1:
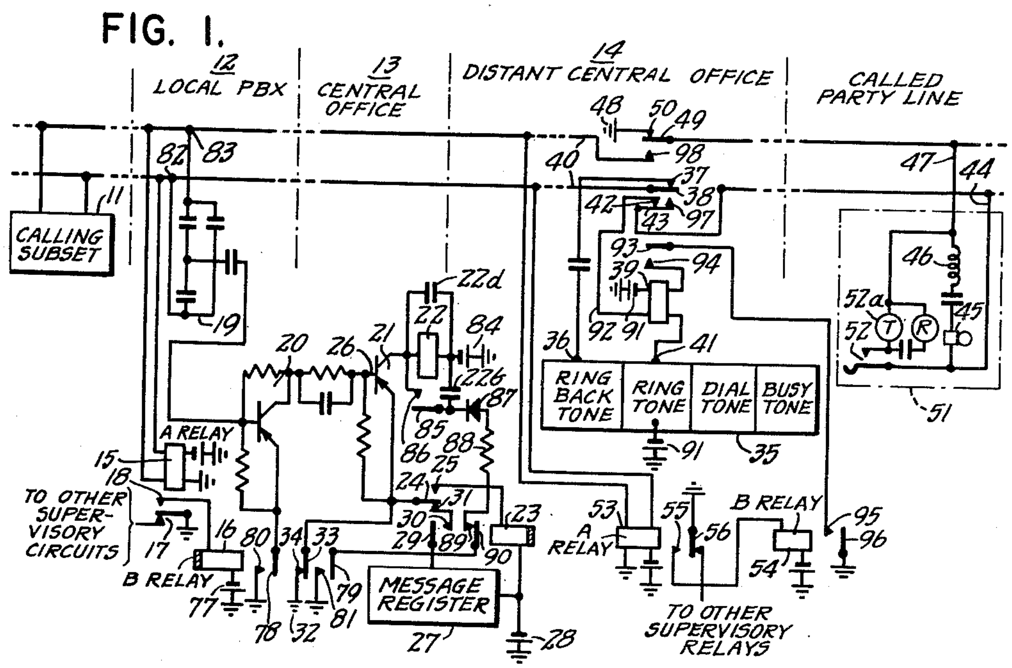
FIG. 1 is a block and schematic diagram showing a circuit using the termination of the ring-back tone to indicate that the called party has answered.

Referring to FIG. 1 there is a (calling) telephone subset 11 connected to the local PABX 12. The telephone line of the PABX 12 is connected to the central office 13 and continues to the distant central office 14. To the pair of telephone wires in the local PABX there is connected an A relay 15 which operates in response to the dial pulses of the calling subset 11. There is associated with the A relay 15 a B relay 16 which is energized when the A relay contact 17 engages contact 18. The B relay 16 is a slow release relay and remains energized for the entire period of time in which the call is attempted or is actually going on. The operation of A and B relays is well-known in the telephony art, these relays sometimes being called supervisory relays and is described in the texts "Automatic Telephone Practice" by H. E. Hershey, sixth edition, published by Technical Publications and "The Design of Switching Circuitry" by Keister, Ritchey and Washburn, published by Van Nostrand, 1951. Also connected to the telephone line at the local PABX is a ring back tone detector circuit 19. To the tone detector circuit 19 there is coupled a first transistor amplifier circuit 20 which in turn is coupled to a second transistor amplifier circuit 21. The output of the second amplifier transistor circuit is coupled to a relay 22. Relay 23 is connected through the transfer contact 24 and the normally open contact 25 of relay 22 to the base 26 of the second transistor amplifier 21. The message register 27 has a circuit completed therethrough from the battery 28 through the transfer contact 29 and the normally open contact 30 of the relay 23, through the normally closed contact 31 and the transfer contact 24 of the relay 22 to ground at 32 through the transfer contact 33 and the normally open contact 34 of the B relay 16. There is coupled to the telephone line at the distant central office 14 a ringing generator 35, which is well known in the telephony art and which provides ring-back tone, ringing tone, dial tone and busy tone depending on the portion of the generator being used. The ring-back tone is passed from the tap 36 through the normally closed contact 37 and the transfer contact 38 to the line 40. In the distant central office there is provided a ring-back tone circuit operation on the telephone line which is well known in the telephony art and need not be discussed here. When ringing potential is applied to the called line, simultaneously the ring-back tone is transmitted from the distant central office 14 through the central office 13 to the local PABX 12. The ringing tone is transmitted from the ringing generator 35 by way of the tap 41 through the normally closed contacts 42 and 43 to the called party line 44, through the high impedance circuit 45 and 46 to the other side of the called party line 47, and to ground at 48 through the transfer contact 49 and the normally closed contact 50 of relay 39. At the called party subset 51 there is a pair of "receiver" contacts 52 which close when a call is answered connecting the telephone line to the called party's subscriber telephone set. Connected to the telephone line at the distant central office 14 there is an A relay 53. The A relay 53 operates in a manner identical with the A relay 15, as described above, and causes the B relay 54 to be energized through the normally open contact 55 and the transfer contact 56.

Referring to the second embodiment of the present invention there is a (calling) telephone subset 11*a* connected to the local PABX telephone line 12*a*. The telephone line 12*a* is coupled to the line 12*b* through the step-down transformer 57. There is a complete circuit provided for the primary side 58 of the step-down transformer 57 through the normally closed contact 59 and the transfer contact 60 of relay 61. The secondary winding 62 of the step-down transformer 57 is coupled to the line 12*b* through the normally closed contacts 63—65 and 64—66 of the relay 61. The PABX telephone line 12*b* is connected through the central office 67 to the called party at 68. A step-up transformer 69 is coupled to the first transistor amplifier 70 which in turn is coupled to a second transistor amplifier 71. The output of the second transistor amplifier 71 is coupled to a relay 72. The supervisory A relay 73 working in conjunction with the B relay 74 is coupled to the local PABX telephone line 12*a*. The B relay 74 is coupled to be energized through the normally open contact 75 and the transfer contact 76.

In order to better understand the operation of the present invention, let us assume that in FIG. 1 a party using the subset 11 is initiating a call to the telephone subset 51. As stated above, one of the objects of the present invention is to provide a device to determine whether or not the party using the subset 51 has answered the call. The calling party at the telephone subset 11 initiates a call which results in the operation of the A relay 15. The operation of A relay 15 closes the operating circuit which thus causes relay 16 to operate and supply "ground" for the ring back tone detector. The B relay 16 is energized by the circuit of the battery 77 through the winding of the relay 16 through the contacts 18 and 17 of relay 15 to ground. The B relay 16 being slow to release, as mentioned above, will remain energized for the period during which the call is attempted and if the call is completed during the period that the conversation is taking place. When the B relay 16 is energized, the transfer contacts 78, 33 and 79 are operated to make connection with their respective normally open contacts 80, 34 and 81. The call having been initiated and having been passed through the central office equipment at 13 and at the distant central office equipment 14 will cause a ringing signal to be transmitted from the ringing generator 35 through the tap 41, through the winding of the relay 39, through the normally closed contacts 42—43, through the called party conductor 44, the high impedance ringer circuits 45—46 to the other side of the called party line 47, through the transfer contact 49, through the normally closed contact 50 to ground at 48. This circuit will produce a ringing sound at the bell 45. Simultaneously, a ring back tone from the ringing generator 35 will be transmitted through the tap 36, through the normally closed contacts 37—38 along the line 40 and by means of the ring back tone circuit, mentioned above, the ring back tone will be transmitted to and received at the local PABX 12 and specifically at the connections 82 and 83. The detector circuit 19 is designed to pass the ring back tone which has an assigned frequency to which the filter circuit 19 is responsive and which discriminates against dial pulses and low frequency tones. The ring back tone being passed through the circuit 19 causes the transistor amplifier circuit 20 to amplify this signal, which in turn is given a second amplification at the transistor circuit 21. The collector of the transistor 21 is connected to the relay 22 to complete an electron flow circuit during the second amplification from battery 84 through the relay 22 through the amplifier 21 through contacts 33 and 34 to ground. The completion of this last-mentioned circuit and the conduction therethrough causes the relay 22 to be energized. When the relay 22 is energized, the contact 85 makes connection with the normally open contact 86 to create a temporary hold circuit through the diode 87, resistor 88, normally closed contacts 89 and 90 to ground through the contacts 79—81. The diode and capacitors of the circuit of relay 22 serve the purpose of keeping the relay in an energized condition during the silent intervals of the ring back tone. The energization of the relay 22 causes its transfer contact 24 to engage with the normally open contact 25. This provides a circuit for the energization of relay 23 from the battery 28 through relay 23 through closed contacts 25—24 to ground through contacts 33, 34. When the relay 23 is energized, the transfer contact 29 makes connection with the normally open contact 30 to establish a partial operating circuit for the message register 27 and to the temporary hold circuit for relay 22 through the contacts 89, 90 is broken. As long as the ring back tone is received, the relay 22 will remain energized and as mentioned above, during the silent intervals by means of the condensers 22*a* and 22*b* being operative. When the called party at 51 lifts his receiver, the receiver contacts 52 will close providing a low resistance shunt across the high impedance circuit 46, thus establishing a D.C. circuit from the battery 91*a* through the ringing generator 35, tap 41 through the winding of relay 39 along the conductor 92 through the closed contacts 42 and 43, along the conductor 44, through the contacts 52, through the transmitter 52*a* to the other side of the line 47, through the relay contacts 49, 50 to ground at 48. The completion of this circuit and the conduction thereto will energize the ring trip relay 39. Relay 39 is energized the moment the call is answered and the operation of the transfer contact 93 to make connection with the normally open contact 94 provides a hold circuit from battery 91 through the "hold" winding of relay 39, through contacts 94—93, through the normally open contact 95 and the transfer contact 96 of the B relay 54 to ground. Simultaneously, when the energization of the relay 39 is made, the transfer contact 38 makes connection with the normally open contact 97 and this transfer breaks the connection between the contacts 42—43. The energization of relay 39 also causes the transfer contact 49 to make connection with the normally open contact 98. The connection of the transfer contact 38 with contact 97 and transfer contact 49 with contact 98 connects the subset 51 to the telephone line for talking purposes. The separation of the contacts 37 and 38 terminates the ring back tone from being transmitted to the local PABX 12. When the ring back tone has been terminated, the relay 22 becomes de-energized and the transfer contact 24 returns to make contact with the normally closed contact 31. The relay 23, which is de-energized by this last-mentioned operation, is a slow release relay so that when contact 24 makes connection with contact 31, the relay contacts 29 and 30 are still engaged providing a circuit from the battery 28 through the message register 27, through the contacts 29—30 and the contacts 31—24 to ground at 32 through relay contacts 33—34 of relay 16. This last-mentioned circuit provides the message register 27 with an indication that the call has been answered. If there has been no answering of the call by the party at 51, and the calling party has abandoned the call, the relay 15 will be de-energized when the calling party releases the connection or "hangs up." This release removes the ground connections for the tone detector with the disconnecting of the transfer contacts 78, 34, and 79, preventing any false operation of the message register 27. Simultaneously, the A relay 53 at the distant central office is also controlled by the calling party and the release operation de-energizes relay 53, which in turn causes relay 54 to be de-energized to eliminate the hold circuit for relay 39 through the engaged points 95—96.

Figure 2:
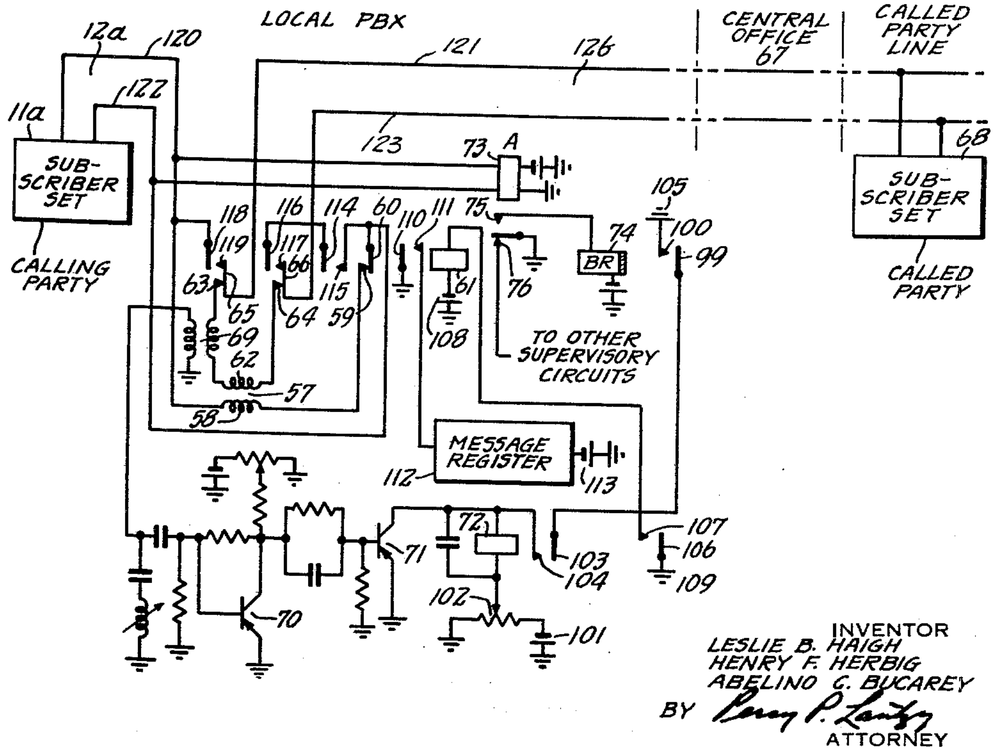
FIG. 2 is a block and schematic diagram showing the circuit which is arranged to respond to the called party's voice to indicate that the called party has answered.

Considering the operation of the second embodiment, let us assume that in FIG. 2 a party using the subset 11*a* is calling the subscriber of the subset 68. When the telephone line circuit is closed at the subset 11*a*, the A relay 73 is energized. Relay 73 when energized closes the circuit for the operation for the B relay 74 which in turn remains energized for the period of the attempted call and the possible ensuing operation time. When the B relay 74 is energized, the contact 99 engages contact 100 providing a holding ground for relay 72. The step-down transformer 58 reduces the voice signals from the subscriber set 68 to a level that will not effect the operation of the answering signal detection. When the called party answers the telephone call, for instance, with the word "hello," the voice signal is passed through the step-up transformer 69 and is amplified at the transistor amplifier 70. There is a second stage of amplification of the voice signal at the transistor amplifier 71. The collector of the transistor amplifier 71 is connected to the relay coil 72 which causes the relay to be energized during this second stage of amplification. When the relay 72 becomes energized it closes its holding circuit from the battery 101 through the potentiometer 102, through the winding of the relay 72, through the contacts 103—104, through the contacts 99—100 to ground at 105. When relay 72 is energized, it sets up a circuit to energize relay 61 from battery 108 through the winding of relay 61 through the closed contacts 107—106 to ground at 109. When the relay 61 is energized, the contact 110 makes connection with contact 111 to operate the message register 112 from battery 113 indicating the call has been answered. The energization of relay 61 also opens the circuit of winding 58 of the transformer 57 when the contacts 59—60 are separated, thus disconnecting the winding 58 from the voice transmission path. The contact 114 makes connection with the contact 115, the contact 116 makes connection with the contact 117 while breaking the connection between contacts 64 and 66, and the contact 118 makes connection with the contact 119 while breaking the connection between contacts 63 and 65. With the transfer of these contacts there is provided a talking circuit from the conductor 120 through the contacts 118—119 to the conductor 121, and from the conductor 122 through the contacts 115—114, 116—117 to the conductor 123. This last-mentioned talking circuit through the relay contacts bypasses the transformers 58 and 69 to provide a direct talking circuit free from the answering signal detection. The relay 72 is held energized as long as the B relay 74 is energized. Since the relay 61 remains energized so long as the relay 72 remains energized the answering signal detector circuit including the message register 112 and the direct talking circuit are kept intact until the calling party releases the connection. In contrast to the embodiment in FIG. 1 the equipment of FIG. 2 is never conditioned to indicate the call has been answered until the called party speaks.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a telephone system a completed call recognition arrangement comprising a private automatic branch exchange, a central office, a called subscriber station coupled to said private automatic branch exchange through said central office, a ring-back tone generator located at said central office to transmit a ring-back tone to said private automatic branch exchange when a call has been initiated therefrom and the called party has not answered, a ring-back tone detector means included in said private automatic branch exchange to detect said tone, indicating means including a message register coupled to said ring-back tone detector and responsive to the termination of said tone to indicate the call has been answered.

2. In a telephone system a completed call recognition arrangement according to claim 1, further including circuitry means coupled to said message register and responsive to an abandonment of the call at said calling subscriber equipment to prevent a false indication of said ring-back tone termination at said message register.

3. In a telephone system a completed call recognition arrangement comprising calling subscriber equipment, a central office, a called subscriber station coupled through said central office to said calling subscriber equipment, a ring-back tone generator located at said central office to transmit a ring-back tone to said calling subscriber equipment when a call has been initiated therefrom and the call has not answered, ring-back tone filter means to pass said ring-back tone and reject all other signals, a transistor amplifier circuit coupled to the output of said ring-back tone filter, a first relay coupled to the output of said transistor amplifier circuit to be energized in response to said ring-back tone, a second relay coupled through the contacts of said first relay to be energized in response to the energization of said first relay, said second relay having a slow contact release characteristic to keep its contacts engaged for a predetermined time after the de-energization of the said second relay, message register means coupled to normally open contacts of said second relay and normally closed contacts of said first relay to receive a signal therethrough when said ring-back tone terminates and during the period of time that said second relay's contacts remain engaged after its de-energization.

4. In a telephone system a completed call recognition arrangement according to claim 3, further including a supervisory relay means which is held energized for the period of an attempted call and the ensuing conversation, circuitry means coupling said message register circuit through the normally open contacts of said supervisor relay to disconnect said register circuit in the event said call is abandoned to prevent a false completed call indication.

5. In a telephone system a completed call recognition arrangement comprising calling subscriber equipment including a calling subscriber station, called subscriber station, a central office coupling said called subscriber station to said calling subscriber equipment, a stepdown transformer included in said calling party equipment to step down the voice signal of the calling party prior to the completion of the call, a step-up transformer included in said calling subscriber equipment to step up the called party's voice signal at the instant said called party answers the call, amplification means coupled to said step-up transformer to amplify the called party's voice signal, a first relay having a plurality of operative contacts coupled to said amplification means to be energized in response to said amplified voice signal, a second relay coupled through said first relay contacts to be energized in response to the energization of said first relay, circuitry means coupling said transformers to said central office switching equipment through the normally closed contacts of said second relay to electrically remove said transformer equipment from being connected to said switching equipment when said second relay is energized.

6. In a telephone system a completed call recognition arrangement according to claim 5, further including circuitry means coupling the calling party subscriber station through the normally open contacts of said second relay to directly couple said calling subscriber station to said switching equipment during the energization of said second relay.

7. In a telephone system a completed call recognition arrangement according to claim 6, further including a supervisory relay means which is coupled to said calling subscriber equipment to be energized and held energized for the period of an attempted call and the ensuing conversation, circuitry means providing a hold circuit for said first relay through the normally open contacts of said supervisory relay to provide a hold circuit therefor until said calling party subscriber station releases the supervisory relay.

8. In a telephone system, a completed call recognition arrangement comprising calling subscriber equipment, telephone switching equipment, called subscriber equipment coupled by said switching equipment to said calling subscriber equipment, audio frequency signals included in said switching equipment controlled by said called subscriber equipment upon answering a call, a detector included in said calling subscriber equipment responsive to said controlled audio frequency signals to detect the completion of said call, and a message register activated by said detector to record said call.

9. In a telephone system, a completed call recognition arrangement comprising calling subscriber equipment, telephone switching equipment, called subscriber equipment coupled by said switching equipment to said called subscriber equipment, audio frequency signals included in said switching equipment controlled by said called subscriber equipment upon answering a call, a detector included in said calling subscriber equipment responsive to said controlled audio frequency signals to detect the completion of said call, and a message register activated by said detector to record the completion of said call.

10. In a telephone system, a completed call recognition arrangement comprising calling subscriber equipment, called subscriber equipment, a private automatic branch exchange and a central office cooperating to interconnect said calling subscriber equipment and said called subscriber equipment, audio frequency signals disposed in said central office controlled by said called subscriber equipment upon answering a call, a detector included in said branch exchange responsive to said controlled audio frequency signals to detect the completion of said call, and a message register included in said branch exchange activated by said detector to record the completion of said call.

11. In a telephone system, a completed call recognition arrangement comprising calling subscriber equipment, telephone switching equipment, called subscriber equipment coupled by said switching equipment to said calling subscriber equipment, a source of audio frequency signal disposed in said switching equipment, means included in said switching equipment responsive to said called party answering a call to terminate the signal emitted from said source, a detector coupled to said switching equipment responsive to the termination of said signal to detect the completion of said call, and a message register activated by said detector to record the completion of said call.

12. In a telephone system, a completed call recognition arrangement comprising calling subscriber equipment, telephone switching equipment, called subscriber equipment coupled by said switching equipment to said calling subscriber equipment, a detector included in said calling subscriber equipment responsive to the voice of the called subscriber upon answering a call, and a message register activated by said detector upon detecting said voice to record the completion of said call.

References Cited in the file of this patent

UNITED STATES PATENTS

| | | |
|---|---|---|
| 2,107,154 | King | Feb. 1, 1938 |
| 2,396,072 | Babcock et al. | Mar. 5, 1946 |
| 2,729,703 | Faulkner et al. | Jan. 3, 1956 |
| 2,754,369 | Skillman | July 10, 1956 |
| 2,883,473 | McDermott | Apr. 21, 1959 |
| 3,004,105 | Goodale et al. | Oct. 10, 1961 |